United States Patent
Behnamfar et al.

(10) Patent No.: US 12,363,775 B2
(45) Date of Patent: Jul. 15, 2025

(54) MULTI-DEVICE SYNCHRONIZATION AND DATA TRANSMISSION

(71) Applicant: Apple Inc., Cupertino, CA (US)

(72) Inventors: Firouz Behnamfar, Los Gatos, CA (US); Ahmed Moustafa, Unterhaching (DE); Ahmed Mostafa Ali Soliman, Munich (DE); Sree Ram Kodali, San Jose, CA (US); Christian W. Mucke, Bad Hofgastein (AT)

(73) Assignee: Apple Inc., Cupertino, CA (US)

( * ) Notice: Subject to any disclaimer, the term of this patent is extended or adjusted under 35 U.S.C. 154(b) by 387 days.

(21) Appl. No.: 17/668,242

(22) Filed: Feb. 9, 2022

(65) Prior Publication Data

US 2023/0096308 A1    Mar. 30, 2023

Related U.S. Application Data

(60) Provisional application No. 63/247,476, filed on Sep. 23, 2021.

(51) Int. Cl.
| | | |
|---|---|---|
| H04W 76/14 | (2018.01) | |
| H04W 72/0453 | (2023.01) | |

(Continued)

(52) U.S. Cl.
CPC ....... *H04W 76/14* (2018.02); *H04W 72/0453* (2013.01); *H04W 72/23* (2023.01); *H04W 72/541* (2023.01); *H04W 76/15* (2018.02)

(58) Field of Classification Search
CPC . H04W 76/14; H04W 72/0453; H04W 72/23; H04W 72/541; H04W 76/15;

(Continued)

(56) References Cited

U.S. PATENT DOCUMENTS

| 8,208,364 B2 | 6/2012 | Walton |
|---|---|---|
| 10,098,129 B2 | 10/2018 | Lindoff |

(Continued)

OTHER PUBLICATIONS

Dominik Seethaler, Harold Artes, Franz Hlawatsch; Detection Techniques for MIMO Spatial Multiplexing Systems; Information Systems Laboratory, Stanford University , vol. 122, No. 3, Mar. 2005, pp. 91-96; Packard 234, 350 Serra Mall, Stanford, CA 94305-9510, USA.

(Continued)

Primary Examiner — Eric Myers
(74) Attorney, Agent, or Firm — FLETCHER YODER PC

(57) ABSTRACT

First user equipment (UE) exchanges at least a portion of data to be transmitted to a communication network with a second UE on a side channel. The UEs then send the data to the network at increased transmission power by using transmit antennas of both the first and second UEs, instead of just those of the first UE. In some cases, the second UE may transmit a variation of the data sent by the first UE to perform transmit diversity and improve signal-to-noise ratio. To avoid unintended beamforming of the transmissions, the network may mix signals (e.g., having a same symbol) received at the same time period but at different sub-carriers, or mix the signals received at different time periods but at the same sub-carrier. The network may notify the UEs of a phase correction value based on the signals, and the UEs may adjust using the phase correction value.

20 Claims, 10 Drawing Sheets

(51) Int. Cl.
*H04W 72/23* (2023.01)
*H04W 72/541* (2023.01)
*H04W 76/15* (2018.01)

(58) Field of Classification Search
CPC . H04W 72/0446; H04W 92/18; H04W 72/20; H04L 1/0618; H04L 1/0625; H04L 1/0631
See application file for complete search history.

(56) References Cited

U.S. PATENT DOCUMENTS

| | | | |
|---|---|---|---|
| 10,484,926 B2 | 11/2019 | Panteleev | |
| 10,568,052 B2 | 2/2020 | Deng | |
| 2018/0183508 A1* | 6/2018 | Zhang | H04B 7/0669 |
| 2020/0260463 A1 | 8/2020 | Lovlekar et al. | |
| 2023/0050681 A1* | 2/2023 | Zhou | H04W 72/20 |
| 2024/0107603 A1* | 3/2024 | Wu | H04B 7/0695 |

OTHER PUBLICATIONS

MMSE Detection for Spatial Multiplexing MIMO (SM-MIMO); https://www.yumpu.com/en/document/read/32557756/mmse-detection-for-spatial-multiplexing-mimo-sm-mimo; KEEE494: 2nd Semester 2009, week 12.
C. Chen, C. Sung, H. Chen; Capacity Maximization Based on Optimal Mode Selection in Multi-Mode and Multi-Pair D2D Communications; IEEE Transactions on Vehicular Technology, vol. 68, No. 7, pp. 6524-6534, Jul. 2019, doi: 10.1109/TVT.2019.2913987.
Notice of Preliminary Rejection for Korean Patent Application No. 10-2022-0105406 dated Feb. 12, 2025; 7 pgs.

* cited by examiner

MULTI-DEVICE SYNCHRONIZATION AND DATA TRANSMISSION

CROSS-REFERENCE TO RELATED APPLICATIONS

This application claims priority to U.S. Provisional Application No. 63/247,476, filed Sep. 23, 2021, entitled "MULTI-DEVICE SYNCHRONIZATION AND DATA TRANSMISSION," the disclosure of which is incorporated by reference.

BACKGROUND

The present disclosure relates generally to wireless communication, and more specifically to increasing transmission power and/or data throughput in wireless communication devices.

One common challenge for user equipment (e.g., a wireless communication device) is limitations on transmission power, which may prevent the user equipment from sending data to a recipient (e.g., a network device, such as a base station or satellite). These limitations may include a power source (e.g., a battery) having limited capacity and regulatory restrictions on transmission power. Large distances between the device and the recipient may exacerbate this issue, causing transmitted signals to undergo large path loss.

Another issue often faced by user equipment is an insufficient rate of data throughput. While allocating more time and/or frequency to wireless communication may help to alleviate this issue, doing so requires valuable network resources. Moreover, while spatial multiplexing techniques may be used to send and receive multiple concurrent signals, this requires addition of more antennas-both to the transmitter of the user equipment and the receiver of the network device, which may either be impossible or expensive to implement.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment that includes a transmitter, a receiver, and processing circuitry communicatively coupled to the transmitter and the receiver. The processing circuitry exchanges, using the transmitter and the receiver, data with additional user equipment to be transmitted to a communication hub. The processing circuitry also sends, using the transmitter, an indication to the communication hub that the data is ready to be sent. The processing circuitry further receives, using the receiver, a grant from the communication hub to send the data, and sends, using the transmitter, the data to the communication hub.

In another embodiment, a communication hub includes a transmitter, a receiver, and signal processing circuitry having a mixer, a low-pass filter, and a phase detector. The communication hub also includes processing circuitry communicatively coupled to the transmitter and the receiver. The processing circuitry receives, via the receiver, a first signal from a first user equipment and a second signal from a second user equipment. The processing circuitry sends the first signal and the second signal to the signal processing circuitry, and receives an indication of a phase difference between the first signal and the second signal from the signal processing circuitry. The processing circuitry further causes the first user equipment, the second user equipment, or both, to adjust a phase based on the phase difference.

In yet another embodiment, a method for wireless communication includes receiving a first signal having a first power level from a first user equipment at a communication hub, receiving a second signal having a second power level from a second user equipment at the communication hub, and transmitting a phase adjustment signal to at least one of the first user equipment and the second user equipment based on a phase difference between the first signal and the second signal. The method also includes receiving data from the first user equipment and the second user equipment at a third power level higher than or equal to the first power level, the second power level, or both, based on the phase adjustment signal.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
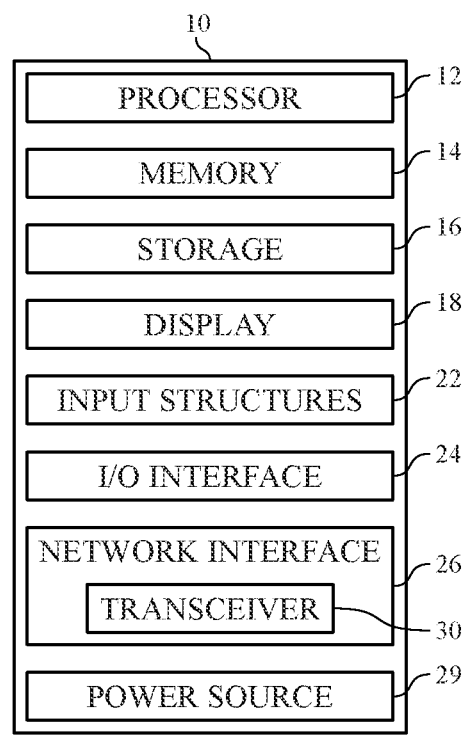
FIG. 1 is a block diagram of user equipment (e.g., an electronic device), according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

One of the main challenges of user equipment (e.g., a wireless communication device) is limitations on transmission power. These limitations may be due to a power source (e.g., a battery) having limited capacity and/or regulatory restrictions on transmission power. Moreover, transmitted signals may undergo large path loss due to large distances between the user equipment ("UE") and a communication hub, such as a base station, high altitude base station, a satellite, a ground station, an access point, and so on. In case of inter-UE communication, a receiving UE may not receive have large antenna gains (e.g., when compared to a communication hub). In some cases, implementing multiple receive antennas, higher transmission power, and/or retransmission of signals (e.g., with combination of the signals at a receiver) may improve receive signal quality. However, these improvements may still not be sufficient to meet certain receive quality standards.

Because the UE may have multiple transmission antennas, transmitting radio frequency (RF) signals over the multiple antennas divides total transmission power for the UE over the antennas. That is, if a UE has N transmission antennas, and transmits signals concurrently over the N transmission antennas, the transmission power for each signal over each transmission antenna is the total transmission power of the UE divided by N. Accordingly, to increase transmission power of the UE, the number of transmission antennas used to transmit signals may be decreased and focused on a less than total number of transmission antennas of the UE. For example, if the UE has four transmission antennas, the UE may transmit a signal over only one of the transmission antennas, and use its full transmission power on the single antenna. Moreover, to increase throughput, the UE may send data to be transmitted to the communication hub to another UE (or more UEs), which may also use a decreased number of antennas to send the data. In this manner, transmission power of the data may be increased due to using multiple UEs, while maintaining good throughput.

However, transmitting the data only once on the reduced number of antennas in this manner may render the RF signal susceptible to errors without transmission redundancy. As such, the other UE(s) may be used to perform transmit diversity to improve signal-to-noise ratio in the signal by transmitting a variation of the signal. The signal and the variation of the signal may then be combined at the receiver, to ensure good signal quality. In particular, a first and second UE may exchange first and second symbols (e.g., data) to be transmitted (e.g., to a communication hub of a network) on, for example, a side channel (e.g., a device-to-device or peer-to-peer channel, such as a Wi-Fi channel, ultra-wideband (UWB) channel, Bluetooth® channel, Near Field Communication (NFC) channel, and so on). In some embodiments, one UE may act as a primary UE and the other UE may act as a secondary UE, where the primary UE confirms that the symbols have been properly exchanged (e.g., with the network). In additional or alternative embodiments, the UEs may have the same roles, such that both UEs may confirm that the symbols have been properly exchanged (e.g., with the network).

The UEs may then use space-time orthogonal block (STOB) coding to send the first and second symbols to the network (e.g., a 4G or long term evolution (LTE®) network, a 5G or New Radio network, and so on). For example, at a first time, the first UE may send the first symbol to the network (e.g., using one antenna at full transmission power of the first UE), and the second UE may concurrently send the second symbol to the network (e.g., using one antenna at full transmission power of the second UE). The network may receive the first and second symbols as a single signal. At a second (e.g., subsequent) time, the first UE may then send a variation of the first symbol (e.g., a negative complex conjugate of the second symbol) to the network (e.g., using one antenna at full transmission power of the first UE), and the second UE may concurrently send a variation of the second symbol (e.g., a complex conjugate of the first symbol) to the network (e.g., using one antenna at full transmission power of the first UE). The network may receive the variations of the first and second symbols as a single signal. The network may then use STOB decoding to extract the first and second symbols from the received signals. In this manner, the UEs may send symbols using greater transmission power (e.g., at full power of the respective UEs), while ensuring good signal quality.

Another issue often faced by the UE is an insufficient rate of data throughput. While allocating more time and/or frequency to wireless communication may help to alleviate this issue, doing so requires valuable network resources. Moreover, while spatial multiplexing techniques may be used to send and receive multiple concurrent signals, this requires addition of more antennas—both to the transmitter of the UE and the receiver of the network device, which may either be impossible or expensive to implement. That is, hardware resources may be particularly limited on the UE due to its limited size, power, and capability. For example, the number of transmission antennas are limited on a single UE, and increasing that number may increase design complexity and cost.

As such, a first and second UE may exchange a number of symbols (e.g., data) corresponding to up to a number of transmit antennas between the UEs. Each UE may then transmit the symbols, each symbol being transmitted by a respective antenna of the UEs. For example, if each UE has two transmit antennas, four symbols may be exchanged between the UEs, and the UEs may concurrently transmit each symbol using a respective transmit antenna (e.g., one symbol per transmit antenna). In this manner, the second UE may increase the data throughput (e.g., doubling the data throughput in the previous example) compared to only using the transmit antennas of the first UE. Advantageously, it may be possible for one UE to use the network registration parameters of the other UE, such that only one UE need register with a network. That is, from the viewpoint of the network, only one UE is coupled, despite both UEs transmitting symbols to the network. The network may use any suitable technique to extract the symbols, including maximum likelihood (ML) techniques, zero forcing (ZF) techniques, minimum mean-square error (MMSE) techniques, successive interference cancellation (SIC) techniques, ordered SIC (OSIC) techniques, and so on.

In some cases, concurrent transmissions from different UEs may result in unintended beamforming due to misalignment of transmissions in time. This may cause undesired cancellation of the signals at the communication hub. To avoid this issue, the network may align phases of the received signals. In order to detect and correct phase difference, a reference signal (RS) structure with alternating resource element assignment to UEs is used. RSs use the same symbol time but they are separate in frequency. Therefore, the network may receive only one RS on each subcarrier. In some embodiments, the network may mix signals (e.g., having the same demodulation reference signal (DMRS)-carrying symbol) received at the same time period but at different sub-carriers. In additional or alternative embodiments, the network may mix signals (e.g., having the same DMRS-carrying symbol) received at different time periods but at the same sub-carrier. After detection of phase difference, the network may notify N−1 out of N transmitting UEs of their phase correction value, and the N−1 UEs may shift the phases of outgoing signals based on the phase correction value.

While the disclosed embodiments reference communication between UEs and a communication hub or network, it should be understood that the embodiments may also be applicable to communication between UEs and other electronic devices such as other UEs.

FIG. 1 is a block diagram of user equipment ("UE") 10 (e.g., an electronic device), according to embodiments of the present disclosure. The UE 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the UE 10.

By way of example, the UE 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the UE 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the UE 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the UE 10 to provide various functionalities.

In certain embodiments, the display 18 may facilitate users to view images generated on the UE 10. In some embodiments, the display 18 may include a touch screen, which may facilitate user interaction with a user interface of the UE 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the UE 10 may enable a user to interact with the UE 10 (e.g., pressing a button to increase or decrease a volume level). The I/O interface 24 may enable the UE 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the UE 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The power source 29 of the UE 10 may include any suitable source of power, such as a rechargeable lithium polymer (Li-poly) battery and/or an alternating current (AC) power converter.

Figure 2:
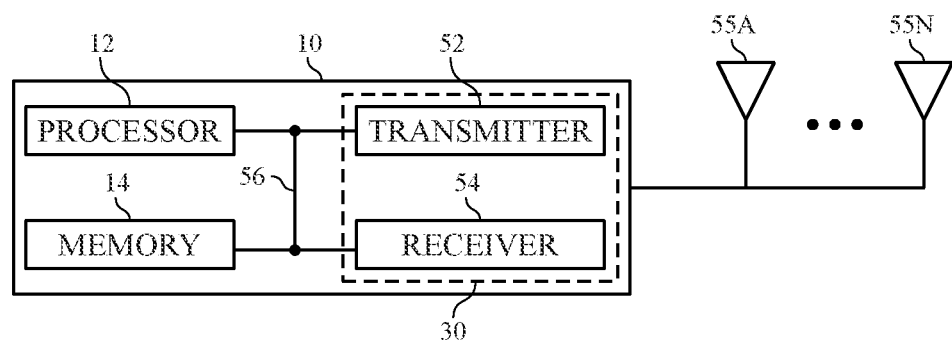
FIG. 2 is a functional diagram of the user equipment ("UE") of FIG. 1, according to embodiments of the present disclosure.

FIG. 2 is a functional diagram of the UE 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The UE 10 may include the transmitter 52 and/or the receiver 54 that respectively enable transmission and reception of data between the UE 10 and an external device via, for example, a network (e.g., including base stations) or a direct connection. As illustrated, the transmitter 52 and the receiver 54 may be combined into the transceiver 30. The UE 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The UE 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the UE 10 may be coupled together by a bus system 56. The bus system 56 may include a data bus, for example, as well as a power bus, a control signal bus, and a status signal bus, in addition to the data bus. The components of the UE 10 may be coupled together or accept or provide inputs to each other using some other mechanism.

Figure 3:
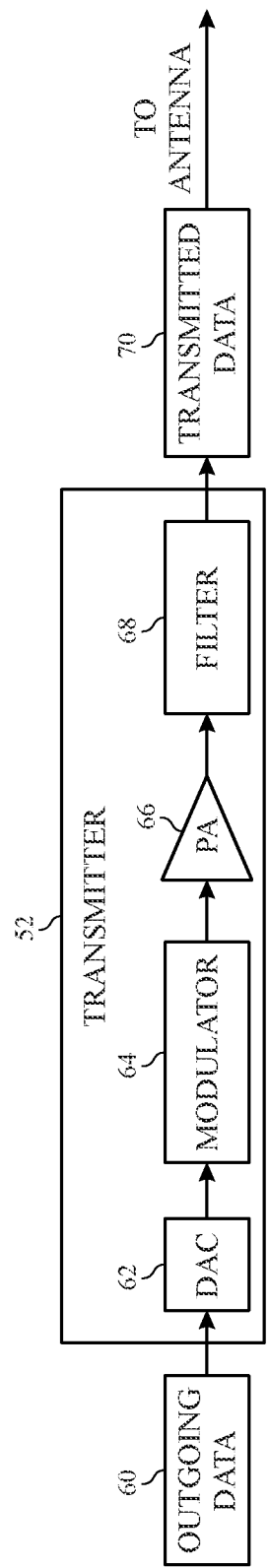
FIG. 3 is a schematic diagram of a transmitter of the UE of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Increasing Transmission Power Using Multiple UEs

As previously mentioned, one of the main challenges of wireless communication is limitations on transmission power of the UE 10. These limitations may be due to the power source 29 (e.g., a battery) having limited capacity and/or regulatory restrictions on transmission power. Moreover, transmitted signals may undergo large path loss due to large distances between the UE 10 and a communication hub, such as a base station, high altitude base station, a satellite, a ground station, an access point (e.g., that creates a wireless local area network, (WLAN)), and so on. In case of inter-UE communication, a receiving UE 10 may not receive have large antenna gains (e.g., when compared to a communication hub). In some cases, implementing multiple receive antennas, higher transmission power, and/or retransmission of signals (e.g., with combination of the signals at a receiver) may improve receive signal quality. However, these improvements may still not be sufficient to meet certain receive quality standards.

Because a UE 10 may have multiple transmission antennas 55, transmitting radio frequency (RF) signals over the multiple antennas 55 divides total transmission power for the UE 10 over the antennas 55. That is, if a UE 10 has N transmission antennas 55, and transmits signals concurrently over the N transmission antennas 55, the transmission power for each signal over each transmission antenna 55 is the total transmission power of the UE 10 divided by N. Accordingly, to increase transmission power of the UE 10, the number of transmission antennas 55 used to transmit signals may be decreased and focused on a less than total number of transmission antennas 55 of the UE 10. For example, if the UE 10 has four transmission antennas 55, the UE 10 may transmit a signal over only one of the transmission antennas 55, and use its full transmission power on the single antenna 55. Moreover, to increase throughput, the UE 10 may send data to be transmitted to the communication hub to another UE (or more UEs), which may also use a decreased number of antennas to send the data.

Figure 4:
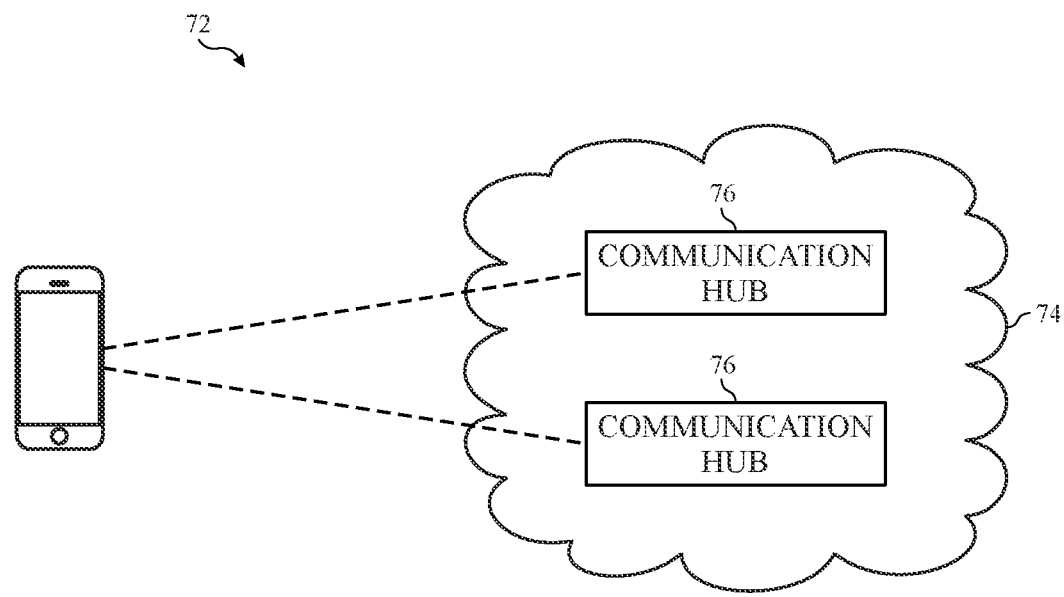
FIG. 4 is a schematic diagram of a communication system having a wireless communication network supported by communication hubs and including the UE of FIG. 1, according to embodiments of the present disclosure

FIG. 4 is a schematic diagram of a communication system 72 having a wireless communication network 74 supported by communication hubs 76 and including the UE 10 of FIG. 1, according to embodiments of the present disclosure. In particular, the communication hubs 76 may include base stations, high altitude base stations, satellites, ground stations, and so on. For example the communication hubs 76 may include Evolved NodeB (eNodeB) base stations that provide 4G/LTE coverage via the wireless communication network 74 to the UE 10. In some embodiments, the communication hubs 76 may include Next Generation NodeB (gNodeB or gNB) base stations and may provide 5G/New Radio (NR) coverage via the wireless communication network 74 to the UE 10. As another example, the communication hubs 76 may include satellites and/or ground stations that provide satellite network coverage via the wireless communication network 74 to the UE 10. As yet another example, the communication hubs 76 may include access points that create wireless local area networks (WLANs). Each of the UE 10 and the communication hubs 76 may include at least some of the components of the electronic device 10 shown in FIGS. 1 and 2, including one or more processors 12, the memory 14, the storage 16, the transmitter 52, the receiver 54, and the associated circuitry shown in FIG. 3.

Figure 5:
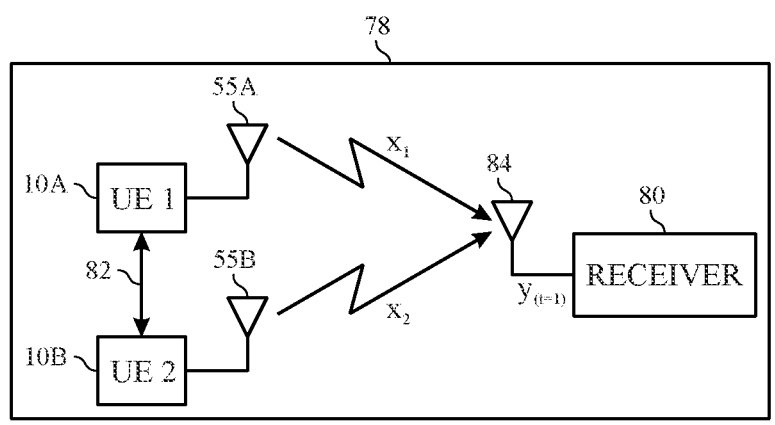
FIG. 5 is a schematic diagram of a communication system having multiple UEs sending signals to a receiver (e.g., of a communication hub), according to embodiments of the present disclosure.

FIG. 5 is a schematic diagram of a communication system 78 having multiple UEs 10A, 10B sending signals to a receiver 80 (e.g., of a communication hub 76 of a network 74), according to embodiments of the present disclosure. The receiver 80 may be part of a base station, high altitude base station, a satellite, a ground station, and so on, which may be part of a communication network 74, such as a 4G or long term evolution (LTE®) network, a 5G or New Radio network, a terrestrial communication network, a satellite network, a non-terrestrial communication network, and so on.

A first UE 10A may intend to send data to the receiver 80. Before sending, the first UE 10A may establish a side channel or sidelink 82 with a second UE 10B. In some embodiments, the first and second UEs 10 may both include smartphones, or one of the UEs may include a smartphone while the other may include a smart watch (e.g., with a wireless modem). The sidelink 82, as discussed in further detail below, may be of any suitable communication protocol that enables the UEs 10A, 10B (collectively 10) to exchange data, such as a device-to-device communication protocol, peer-to-peer communication protocol, the Wi-Fi communication protocol, an ultra-wideband (UWB) communication protocol, the Bluetooth® communication protocol, a Near Field Communication (NFC) communication protocol, and so on. In some embodiments, the first UE 10A may send a first signal having a first portion of the data to the receiver 80 (e.g., using a single antenna 55A), while the second UE 10B may send a second signal having a second portion of the data to the receiver 80 (e.g., using a single antenna 55B). In particular, the UEs 10 may use space-time orthogonal block (STOB) coding to send the first and second symbols $x_1$, $x_2$ to the receiver 80.

For example, the first and second UEs 10 may (e.g., at a first time) exchange first and second symbols of data (e.g., $x_1$ and $x_2$) to be transmitted (e.g., to the receiver 80) on the sidelink 82. The symbols $x_1$, $x_2$ may be data that the first UE 10A intends to send to the receiver 80, the second UE 10B intends to send to the receiver 80, or both. The first UE 10A may then (e.g., at a second time) send a first symbol $x_1$ to the receiver 80 using antenna 55A, while the second UE 10B may concurrently send a second symbol $x_2$ to the receiver 80 using antenna 55B. As such, the first UE 10A may use its full transmission power to send the first symbol $x_1$, and the second UE 10B may use its full transmission power to send the second symbol $x_2$, rather than, for example, the first UE 10A apportioning its transmission power to send the first and second symbols $x_1$, $x_2$, thus increasing (e.g., possibly doubling or more) the transmission power used to send the two symbols. In this manner, transmission power of the data may be increased due to using multiple UEs, while maintaining good throughput. Moreover, the UEs 10 transmit different symbols, $x_1$ and $x_2$, concurrently (e.g., at the same time) and/or on overlapping (e.g., the same) frequencies (or channels), thus avoiding increasing network resource complexity.

The receiver 80 of the communication hub 76 may receive both RF signals sent by the UEs 10 as a single received signal at a receive antenna 84, and recover the original symbols $x_1$ and $x_2$ and from the received signal using the Equation 1:

$$y_j = \Sigma_i H_{ij} x_i + n_j \quad \text{(Equation 1)}$$

where $y_j$ is the extracted symbol received at receive antenna j, $H_{ij}$ is the channel matrix from transmit antenna i to the receive antenna j, and $n_j$ is noise at the receive antenna j.

However, transmitting a signal having the data only once on the reduced number of antennas 55 in this manner may render the signal susceptible to errors without transmission redundancy. As such, the second UE 10B may be used to perform transmit diversity to improve signal-to-noise ratio in the signal by transmitting a variation of the signal. The signal and the variation of the signal may then be combined at the receiver 80, to ensure good signal quality.

Figure 6:
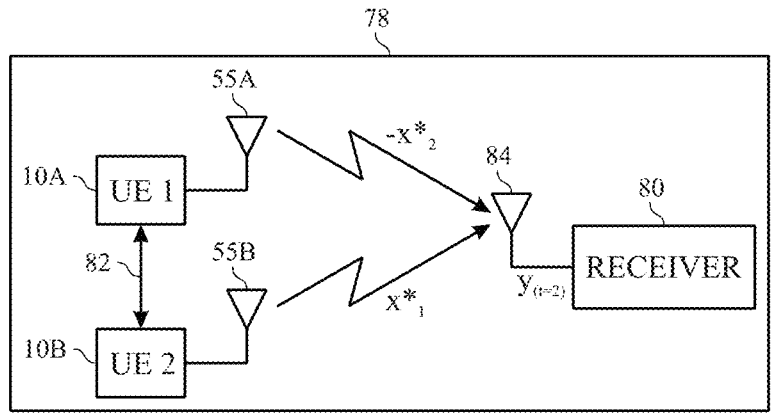
FIG. 6 is a schematic diagram of a communication system having the multiple UEs sending variations of the signals shown in FIG. 5 to the receiver to perform transmit diversity, according to embodiments of the present disclosure.

FIG. 6 is a schematic diagram of a communication system having the UEs 10A, 10B sending variations of the signals shown in FIG. 5 to the receiver 80 to perform transmit diversity, according to embodiments of the present disclosure. One way to maintain a high transmit power level and improve receiver signal-to-noise ratio is to have the UEs 10 cooperate to transmit variations of the same data. A scheme similar to the Space-Time Orthogonal Block (STOB) codes may be used. UE i may transmit, at time index j, the symbol at row number i and column number j of a STOB codeword. For example, with the number of transmitting UEs 10 ($N_{Tx}$) being equal to 2, the corresponding STOB codeword may be:

$$\begin{pmatrix} x_1 & -x_2^* \\ x_2 & x_1^* \end{pmatrix} \quad \text{(Equation 2)}$$

That is, at a first time (e.g., t=1 corresponding to a first transmission time index), as shown in FIG. 5, the first UE 10A sends the first symbol $x_1$, and the second UE 10B sends (e.g., concurrently) the second symbol $x_2$. At a second time (e.g., t=2 corresponding to a second transmission time index), as shown in FIG. 6, the first UE 10A sends a variation of the second symbol $x_2$, and the second UE 10B sends (e.g., concurrently) a variation of the first symbol $x_1$. The variation of the second symbol $x_2$ sent by the first UE 10A may include a negative complex conjugate of the second symbol (e.g., $-x_2^*$), and the variation of the first symbol $x_1$ sent by the second UE 10B may include a positive complex conjugate of the first symbol (e.g., $x_1^*$), but, in some cases, this may be reversed.

The network 74 may recover the first symbol $x_1$ by estimation using Equation 3:

$$\hat{x}_1 = h_1^* y_{t=1} + h_2 y_{t=2}^* \quad \text{(Equation 3)}$$

where $\hat{x}_1$ is an estimation of the first symbol $x_1$. Similarly, the network 74 may recover the second symbol $x_2$ by estimation using Equation 4:

$$\hat{x}_2 = h_2^* y_{t=1} - h_1 y_{t=2}^* \quad \text{(Equation 4)}$$

This transmit diversity may increase communication quality by lowering bit rate error, in some cases resulting in an improvement of transmission power on the order of 3 decibels (dB). While FIGS. 5 and 6 show two UEs 10 sending two symbols at two times via two transmit antennas 55, it should be noted that N symbols may be sent by N transmission signals from N transmit antennas 55 (from less than or equal to N UEs 10), and N variations of the N symbols may be sent by the N transmission signals from N transmit antennas 55 to perform transmit diversity.

Figure 7:
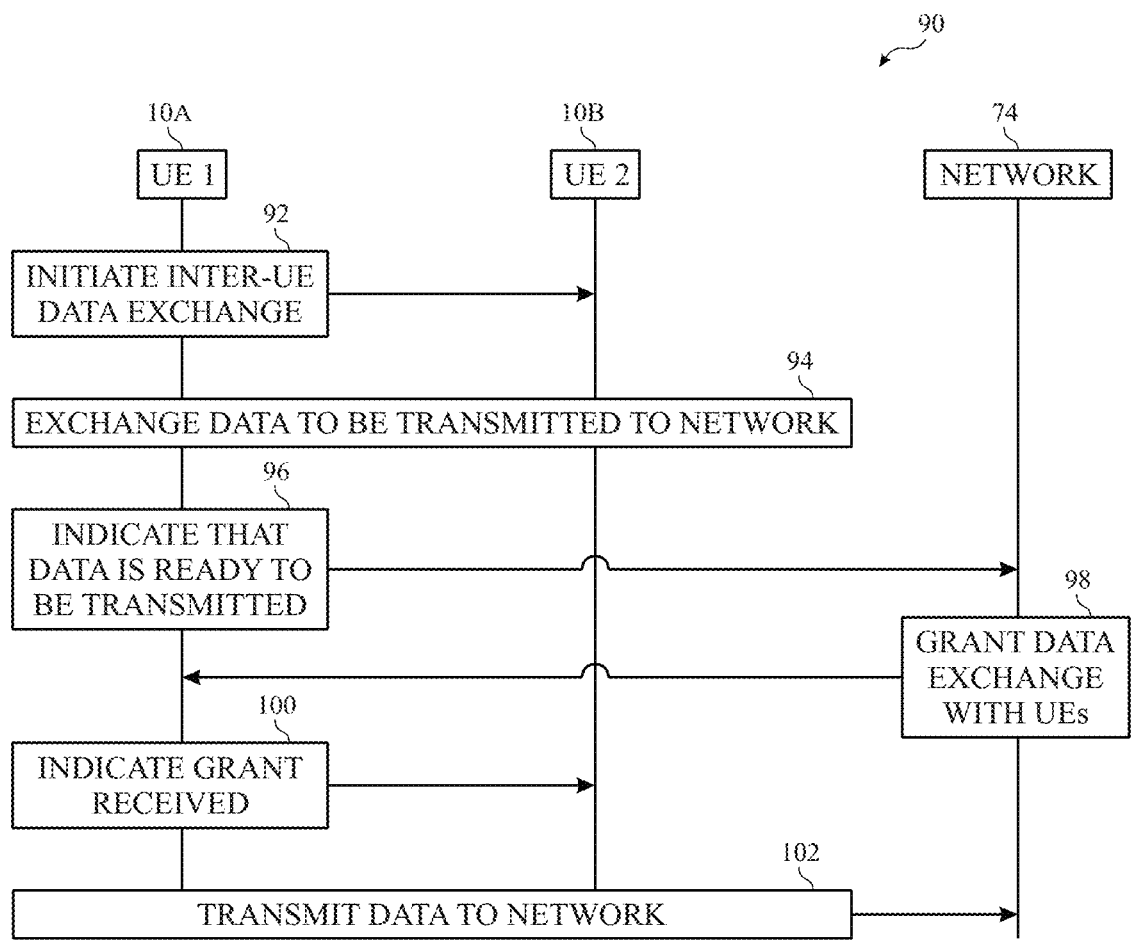
FIG. 7 is a flowchart of a method for multiple UEs to send data to the network of FIG. 4 with the UEs acting in primary and secondary roles, according to embodiments of the present disclosure.

The UEs 10 and the network 74 may coordinate to exchange symbols. In some embodiments, one UE (e.g., 10A) may act as a primary UE and the other UE (e.g., 10B) may act as a secondary UE, where the primary UE 10A confirms that the symbols have been properly exchanged (e.g., with the network 74). FIG. 7 is a flowchart of a method 90 for the UEs 10 to send data to the network 74 with the UEs 10 acting in primary and secondary roles, according to embodiments of the present disclosure. Any suitable device (e.g., a controller) that may control components of the UEs 10, the network 74, and/or the communication hubs 76, such as one or more processors 12, may perform the method 90. In some embodiments, the method 90 may be implemented by executing instructions stored in a tangible, non-transitory, computer-readable medium, such as the memory 14 or storage 16, using the one or more processors 12. For example, the method 90 may be performed at least in part by one or more software components, such as operating systems, software applications, and the like, of the UEs 10, the network 74, and/or the communication hubs 76. While the method 90 is described using steps in a specific sequence, it should be understood that the present disclosure contemplates that the described steps may be performed in different sequences than the sequence illustrated, and certain described steps may be skipped or not performed altogether.

In process block 92, the first UE (e.g., "UE 1," 10A) initiates inter-UE data exchange with the second UE (e.g., "UE 2," 10B). In particular, the first UE 10A, the second UE 10B, or both, may have data to transmit to the network 74. The UEs may then exchange at least a portion of that data (e.g., a portion to be transmitted by the first UE 10A may be sent by the second UE 10B, and/or a portion to be transmitted by the second UE 10B may be sent by the first UE 10A) via a side channel or sidelink 82, as discussed in further detail below. In this example, since the first UE 10A is in a primary role and the second UE 10B is in a secondary role, the first UE 10A may initiate inter-UE data exchange with the second UE 10B (e.g., by sending an indication to the second UE 10B to initiate the data exchange). In process block 94, the data is then exchanged between the UEs 10.

Because the first UE 10A is the primary UE, in process block 96, it sends an indication to the network 74 that the data is ready to be transmitted (by the two UEs). In response to receiving this indication, the network 74 (e.g., via a communication hub 76), in process block 98, sends an indication back to the primary UE (e.g., the first UE 10A)

granting exchange of the data with the UEs 10. In response to receiving the grant, in process block 100, the first UE 10A may send an indication to the second UE 10B that the grant from the network 74 has been received. The grant may be dynamic or semi-static, and include UE indexes, such that a demodulation reference signal (DMRS) pattern used to synchronize the UEs 10 may be adjusted accordingly. In process block 102, the UEs 10 send the data to the network 74. In particular, the UEs 10 may use a scheme similar to STOB codes as shown in Equation 2 to send symbols, and the network 74 may extract the symbols using STOB decoding as shown in Equations 3 and 4. The data and/or symbols may, for example, include voice call data and/or messaging data (e.g., electronic mail data, Short Message Service (SMS) data, and so on).

Figure 8:
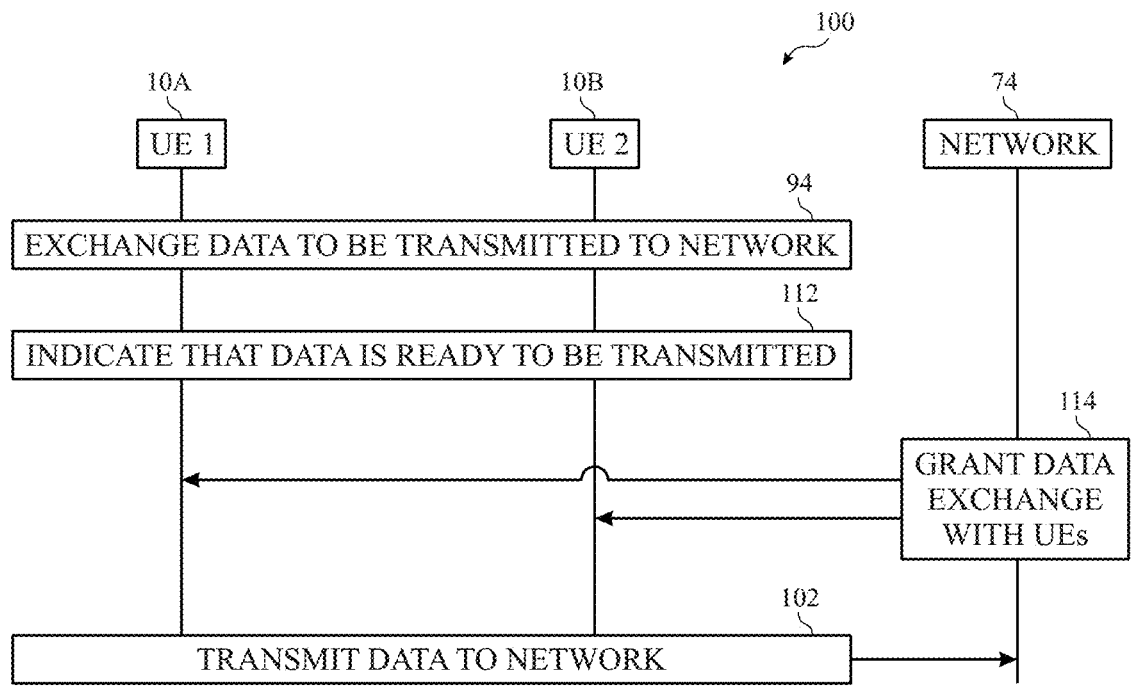
FIG. 8 is a flowchart of a method for multiple UEs to send data to the network of FIG. 4 with the UEs acting in equal roles, according to embodiments of the present disclosure.

In additional or alternative embodiments, the UEs 10 may have the same or equal roles (e.g., neither is primary or secondary), such that both UEs 10 may confirm that the symbols have been properly exchanged (e.g., with the network 74). FIG. 8 is a flowchart of a method 110 for the UEs 10 to send data to the network 74 with the UEs 10 acting in equal roles, according to embodiments of the present disclosure. Any suitable device (e.g., a controller) that may control components of the UEs 10, the network 74, and/or the communication hubs 76, such as one or more processors 12, may perform the method 110. In some embodiments, the method 110 may be implemented by executing instructions stored in a tangible, non-transitory, computer-readable medium, such as the memory 14 or storage 16, using the one or more processors 12. For example, the method 110 may be performed at least in part by one or more software components, such as operating systems, software applications, and the like, of the UEs 10, the network 74, and/or the communication hubs 76. While the method 110 is described using steps in a specific sequence, it should be understood that the present disclosure contemplates that the described steps may be performed in different sequences than the sequence illustrated, and certain described steps may be skipped or not performed altogether.

In process block 94, similar to the method 90 of FIG. 7, the UEs 10 exchange data that is to be transmitted to the network 74. Either UE 10 may initiate this data exchange with the other UE 10. In process block 112, both UEs 10 send an indication to the network 74 that the data is ready to be transmitted. In particular, the first UE 10A may indicate that a first portion of the data that the UEs 10 intend to send to the network 74 is ready, and the second UE 10B may indicate that a second portion of the data that the UEs 10 intend to send to the network 74 is ready. In response to receiving the indication, and in process block 114, the network 74 grants exchange of the data with the UEs 10 by sending an indication to each of the UEs 10. The grant may be dynamic or semi-static, and include UE indexes, such that a DMRS pattern used to synchronize the UEs 10 may be adjusted accordingly. In response to receiving the grant, in process block 102, the UEs 10 send the data to the network 74. The data and/or symbols may, for example, include voice call data and/or messaging data (e.g., electronic mail data, SMS data, and so on). In particular, the UEs 10 may use a scheme similar to STOB codes as shown in Equation 2 to send symbols, and the network 74 may extract the symbols using STOB decoding as shown in Equations 3 and 4. While FIGS. 7 and 8 illustrate two UEs 10 coordinating to send data to the network 74, it should be understood that any suitable number of UEs (e.g., two or more, four or more, eight or more, and so on) may coordinate to send data to the network 74.

Figure 9:
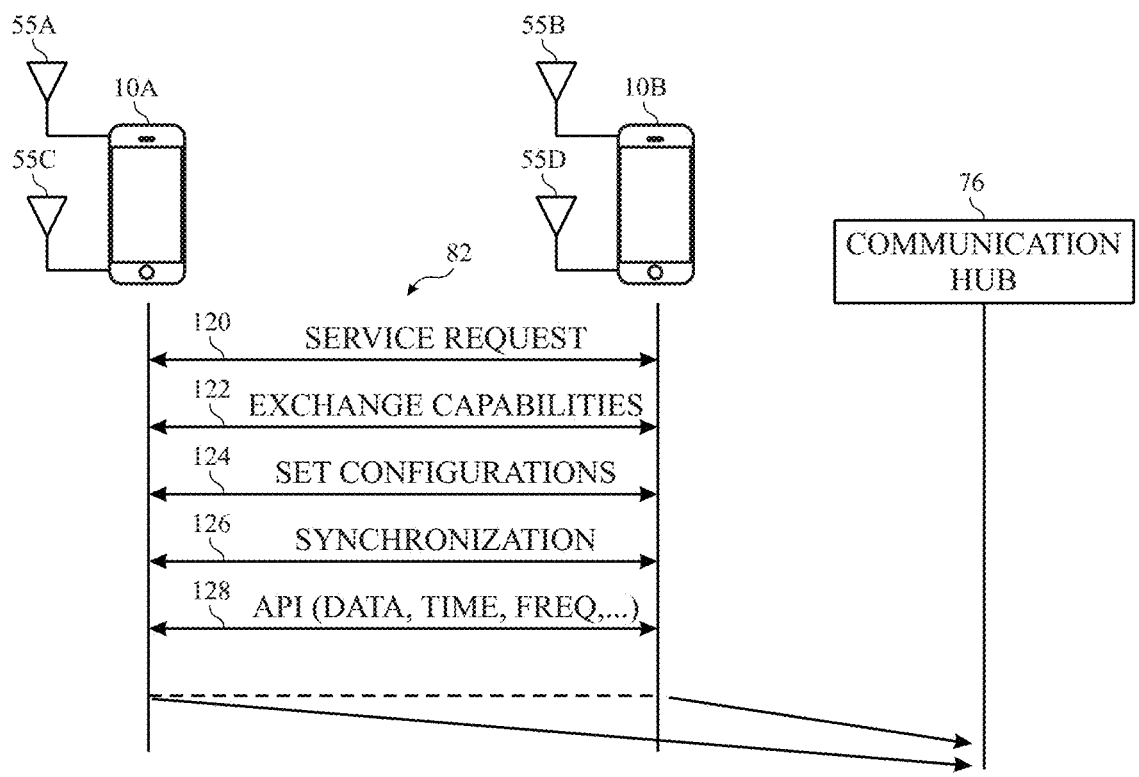
FIG. 9 is a diagram of operations that may be performed by multiple UEs using a side channel or sidelink, according to embodiments of the present disclosure.

FIG. 9 is a diagram of operations that may be performed by the UEs 10 using the side channel or sidelink 82, as mentioned above, according to embodiments of the present disclosure. The sidelink 82 may be implemented over a relatively short distance between the two UEs 10 (e.g., within 1 meter (m), 2 m, 3 m, 5 m, 10 m, 25 m, 50 m, 100 m, and so on). As such, there may be close to ideal channel conditions on the sidelink 82 (e.g., negligible to no delay or latency, large bandwidth, and so on). Both UEs 10 may be synchronized (e.g., using similar timing or clock conditions). For example, distributed processing (e.g., where one UE (e.g., 10A) may process at least some tasks of the other UE (e.g., 10B)) may be implemented. The sidelink 82 may be implemented by any suitable device-to-device or peer-to-peer communication protocol, such as Wi-Fi, ultra-wideband (UWB), Bluetooth®, Near Field Communication (NFC), and so on.

As illustrated, a first UE (e.g., 10A) may include two antennas (e.g., 55A, 55C), and a second UE (e.g., 10B) may include two antennas (e.g., 55B, 55D), though each UE 10 may include any suitable number of antennas (e.g., one or more antennas). Using the sidelink 82, one UE (e.g., 10A) may send a service request 120 to the other UE (e.g., 10B) to, for example, send data to the network 74. In such cases, the UE 10A sending the service request 120 may be the primary UE, and the UE 10B receiving the service request 120 may be the secondary UE. Accordingly, the secondary UE may assist the primary UE in its activities, such as sending and/or receiving data to and/or from the network 74. Additionally, the UEs 10 may exchange their capabilities 122 (e.g., supported frequency bands, antenna information, and so on), and set appropriate configurations 124 (e.g., operational parameters, such as frequencies to transmit and/or receive on, antennas, timing, clock signals) to use based on the exchanged capabilities. The UEs 10 may synchronize 126 RF transmission and/or reception by setting the appropriate configurations 124 (e.g., timing and/or clock signals) and/or exchange application programming interface (API) information 128 (e.g., date, time, frequency, and so on). The UEs 10 may then cooperate to transmit data to the network 74. Advantageously, the two UEs 10 may both operate on the network 74 (or vendor) to which the first UE 10A is subscribed, even if the second UE 10B is subscribed to a different network 74 or does not have a subscriber identity module or subscriber identification module (SIM) card. This is because the first UE 10A is the primary UE 10A, may establish a connection with the network 74, and the second UE 10B may piggyback or use the same credentials as the first UE 10A (which may be sent to the second UE 10B from the first UE 10A on the sidelink 82).

Increasing Transmission Throughput Using Multiple UEs

Another issue often faced by the UE 10 is an insufficient rate of data throughput. While allocating more time and/or frequency to wireless communication may help to alleviate this issue, doing so requires valuable network resources. Moreover, while spatial multiplexing techniques may be used to send and receive multiple concurrent signals, this requires addition of more antennas—both to the transmitter 52 of the UE 10 and the receiver 80 of the network device 74, which may either be impossible or expensive to implement. That is, hardware resources may be particularly limited on the UE 10 due to its limited size, power, and capability. For example, the number of transmission antennas 55 are limited on a single UE 10, and increasing that number may increase design complexity and cost.

Figure 10:
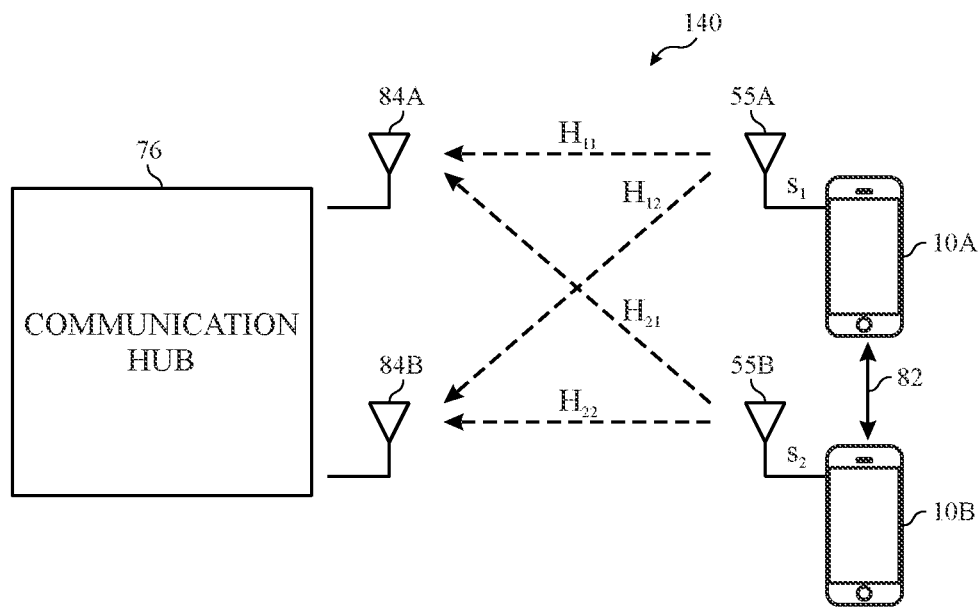
FIG. 10 is a schematic diagram of a communication system having two UEs sending signals to a receiver (e.g., of a communication hub of the wireless network of FIG. 4) with two receive antennas, according to embodiments of the present disclosure.

As such, a first and second UE (e.g., 10A, 10B) may exchange a number of symbols (e.g., data) corresponding to up to a number of transmit antennas 55 between the UEs 10. Moreover, the network 74 may receive the data via any suitable number of (e.g., multiple) receive antennas 84. FIG. 10 is a schematic diagram of a communication system 140 having multiple UEs 10A, 10B sending signals with two transmit antennas 55A, 55B to a receiver 80 (e.g., of a communication hub 76 of a network 74) with two receive antennas 84A, 84B, according to embodiments of the present disclosure. As explained with reference to FIGS. 5, 6, and 9, the first UE 10A (and/or the second UE 10B) may intend to send data (e.g., at least first and second symbols $x_1$ and $x_2$, which may be represented as transmitted symbol vectors $s_1$ and $s_2$) to the receiver 80 of the communication hub 76 of the network 74. Before sending, the first UE 10A may establish a side channel or sidelink 82 with the second UE 10B. The first UE 10A may then send a first portion of the data (e.g., at least the symbol $x_2$) to the second UE 10B, with the intention to send a second portion of the data (e.g., at least the symbol $x_1$) to the receiver 80 of the communication hub 76 of the network 74 while the second UE 10B sends (e.g., concurrently sends) at least the first portion of the data to the receiver 80 of the communication hub 76 of the network 74.

For example, as shown in FIG. 10, the two UEs 10 may establish the sidelink 82, and the first UE 10A may send the second symbol $x_2$ to the second UE 10B over the sidelink 82. Then, the first UE 10A may send the first symbol $x_1$ (e.g., as the transmitted symbol vector $s_1$) which may be sent from a first transmit antenna 55A, received at a first receive antenna 84A of the receiver 80 of the communication hub 76 of the network 74 over an RF channel having channel matrix $H_{11}$, and received at a second receive antenna 84B of the receiver 80 over an RF channel having channel matrix $H_{12}$. Similarly, the second UE 10B may send the second symbol $x_2$ (e.g., as the transmitted symbol vector $s_2$), which may be sent from a second transmit antenna 55B, received at the first receive antenna 84A over an RF channel having channel matrix $H_{21}$, and received at the second receive antenna 84B over an RF channel having channel matrix $H_{22}$. In this manner, the UEs 10 transmit different symbols, $x_1$ and $x_2$ (e.g., as the transmitted symbol vectors $s_1$ and $s_2$), concurrently (e.g., at the same time) and/or on overlapping (e.g., the same) frequencies (or channels), thus avoiding increasing network resource complexity. As such, the first UE 10A is effectively taking advantage of the transmit antenna(s) 55B of the second UE 10B.

Using a matrix expression (e.g., of the general relationship shown in Equation 1), the network 74 may extract the symbols as received symbol vectors $r_1$ and $r_2$, which respectively correspond to $s_1$ and $s_2$, using the following relationship:

$$\begin{bmatrix} r_1 \\ r_2 \end{bmatrix} = \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} \quad \text{(Equation 5)}$$

where, generally, $r_j$ is the extracted symbol received at receive antenna j, $H_{ij}$ is the channel matrix from transmit antenna i to the receive antenna j, $s_i$ is symbol transmitted at the transmit antenna i, and $n_j$ is noise at the receive antenna j. Moreover, $n_1$ is noise at the first receive antenna 84A, and $n_2$ is noise at the second receive antenna 84B. In particular, the network 74 may use any suitable detection processing techniques to extract the symbols $x_1$ and $x_2$, such as a maximum likelihood (ML) technique, a zero forcing (ZF) technique, a minimum mean-square error (MMSE) technique, a successive interference cancellation (SIC) technique, an ordered SIC (OSIC) technique, and so on.

For example, when using the linear equalization-based ZF technique for spatial multiplexing to extract symbols, the network 74 may estimate a transmitted symbol vector s as:

$$y_{zf} = G \times r \quad \text{(Equation 6)}$$

where $y_{zf}$ is the result of ZF equalization (e.g., before quantization), G is an equalization matrix given by the pseudo-inverse of the channel matrix H, and r is the received vector at the receiver 80 of the network 74. r may be defined using a more generalized version of Equation 1, and may be represented as:

$$r = H \times s + n \quad \text{(Equation 7)}$$

where n is noise received at the receive antenna 84. Moreover, G may be represented by:

$$G = (H^H \times H)^{-1} \times H^H \quad \text{(Equation 8)}$$

As another example, when using the MMSE decoding for spatial multiplexing to extract symbols, the network 74 may estimate a transmitted symbol vector s as:

$$y_{MMSE} = G \times r \quad \text{(Equation 9)}$$

where $y_{MMSE}$ is the result of MMSE equalization (e.g., before quantization), r may be represented by Equation 7 above, and G minimizes the mean square error of:

$$E\{\|G \times r - s\| \times 2\} \quad \text{(Equation 10)}$$

As such, G may be represented by:

$$G = (H^H \times H + \sigma^2 \times I)^{-1} \times H^H \quad \text{(Equation 11)}$$

In some embodiments, the two UEs 10 may use the method 90 of FIG. 7 to send the symbols to the network 74, with the first UE 10A acting as a primary UE and the second UE 10B acting as a secondary UE. In additional or alternative embodiments, the two UEs 10 may use the method 110 of FIG. 8 to send the symbols to the network 74, with the UEs 10 acting in equal roles.

Figure 11:
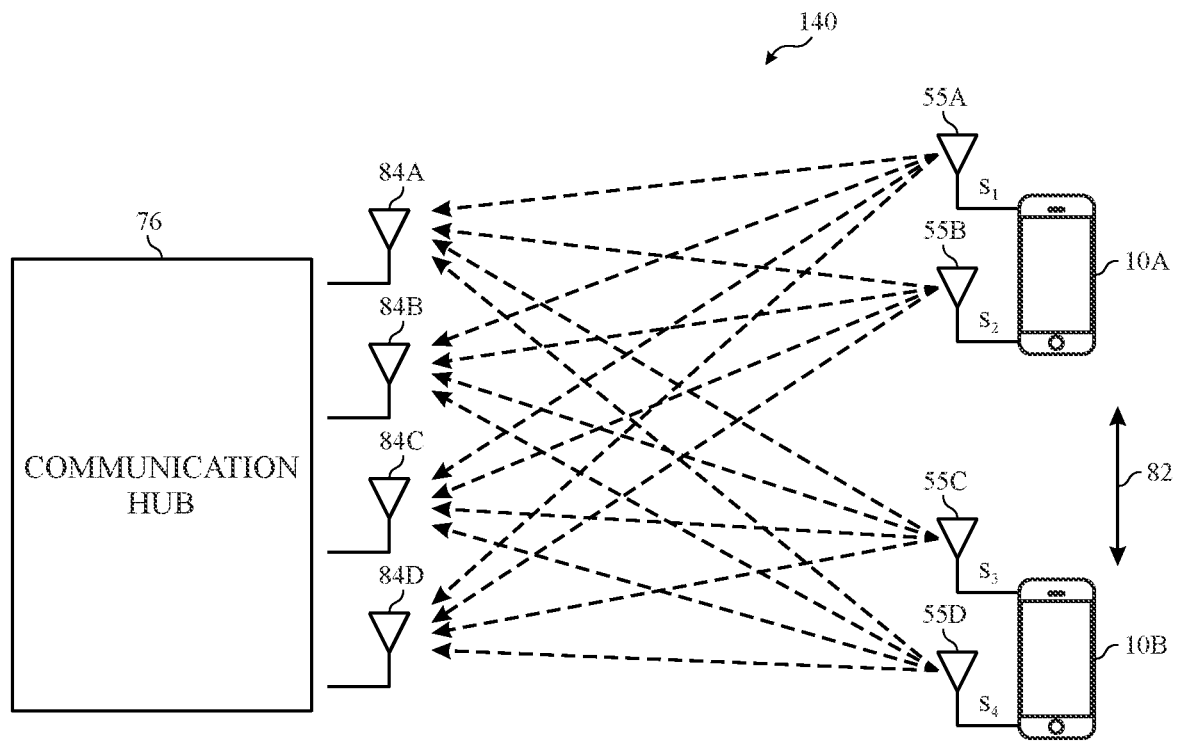
FIG. 11 is a schematic diagram of a communication system having four UEs sending signals with four transmit antennas to a receiver (e.g., of a communication hub of the wireless network of FIG. 4) with four receive antennas, according to embodiments of the present disclosure.

As mentioned above, it should be understood that any suitable number of UEs 10 and any number of transmitting antennas 55 may be used to send the data to the network 74. FIG. 11 is a schematic diagram of a communication system 150 having multiple UEs 10A, 10B sending signals with four transmit antennas 55A, 55B, 55C, 55D to a receiver 80 (e.g., of a communication hub 76 of a network 74) with four receive antennas 84A, 84B, 84C, 84D according to embodiments of the present disclosure. Using a matrix expression (e.g., of the general relationship shown in Equation 1), the network 74 may extract transmitted symbols $x_1$, $x_2$, $x_3$, $x_4$ (sent as transmitted symbol vectors $s_1$, $s_2$, $s_3$, $s_4$) as received symbol vectors $r_1$, $r_2$, $r_3$, $r_4$, using the following relationship:

$$\begin{bmatrix} r_1 \\ r_2 \\ r_3 \\ r_4 \end{bmatrix} = \begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix} \begin{bmatrix} s_1 \\ s_2 \\ s_3 \\ s_4 \end{bmatrix} + \begin{bmatrix} n_1 \\ n_2 \\ n_3 \\ n_4 \end{bmatrix} \quad \text{(Equation 12)}$$

where, generally, $r_j$ is the extracted symbol received at receive antenna j, $H_{ij}$ is the channel matrix from transmit antenna i to the receive antenna j, $s_i$ is symbol transmitted at the transmit antenna i, and $n_j$ is noise at the receive antenna j.

In this manner, the second UE 10B may increase the data throughput (e.g., doubling the data throughput when using only the first UE 10A). Moreover, using four transmit antennas 55A, 55B, 55C, 55D of two UEs 10A, 10B to transmit data to the network 74 instead of, for example, four transmit antennas of a single UE (e.g., 10A) may split the aggregate transmission power of both UEs 10 over four transmit antennas instead of splitting the aggregate transmission power of the single UE 10 over four transmit antennas, increasing (e.g., doubling) the transmission power of the data to the network 74, thus increasing reliability of the overall transmissions and lowering bit error rate. For example, gain for using the two UEs 10A, 10B, compared to using the single UE 10A, to send the symbols $s_1$, $s_2$, $s_3$, $s_4$ over the four transmit antennas 55A, 55B, 55C, 55D, may be on the order of 6 decibels (dB). Advantageously, it may be possible for one UE (e.g., 10B) to use the network registration parameters of the other UE (e.g., 10A), such that only one UE (e.g., 10A) need register with a network (e.g., 74). That is, from the viewpoint of the network 74, only one UE 10A is coupled, despite both UEs 10A, 10B transmitting symbols to the network 74. Indeed, only one UE (e.g., 10A) may be in a coverage area of base station 76 and communicating with the network 74 supported by the base station 76, while another UE (e.g., 10B) may be located outside of the coverage area, despite both UEs 10A, 10B sending symbols to the network 74.

Synchronization Using Reference Signals

Figure 12:
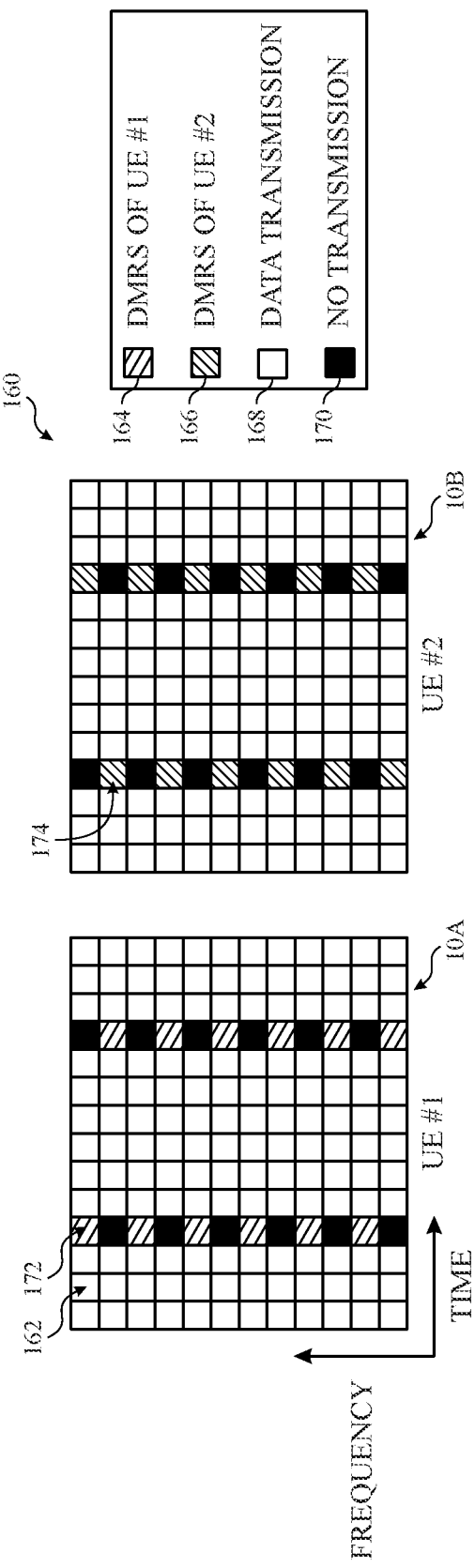
FIG. 12 is a set of plots of an RS structure for which demodulation reference signal (DMRS)-carrying symbols are received at the same time period and at different sub-carriers, according to embodiments of the present disclosure.

In some cases, concurrent transmissions from multiple UEs 10 may result in unintended beamforming due to misalignment of transmissions in time. This may cause undesired cancellation of the signals at the communication hub 76. To avoid this issue, the network 74 may facilitate aligning phases of transmitted signals from the UEs. In order to detect and correct phase difference, the network 74 may implement a reference signal (RS) structure 160 with alternating resource element assignment to UEs 10, as shown in FIG. 12. RSs may use the same symbol time or duration, separated by frequency. Therefore, the network 74 may receive one RS on each subcarrier 162 (where each block in the grid represents a subcarrier). As illustrated, blocks 164 represent demodulation reference signals (DMRS) sent by a first UE (e.g., 10A), blocks 166 represent DMRS sent by a second UE (e.g., 10B), blocks 168 represent time periods with data transmission (e.g., sent by at least one of the UEs 10A, 10B), and blocks 169 represent time periods with no data transmission (e.g., sent by at least one of the UEs 10A, 10B).

As shown in FIG. 12, the network 74 may receive or mix signals (e.g., having the same DMRS-carrying symbol) at the same time period and at different sub-carriers 162. The set of plots of the RS structure 160 each have a horizontal axis representing time (apportioned into time periods) and a vertical axis representing frequency (apportioned into sub-carriers 162). As illustrated, the first UE 10A may transmit a first signal $x_1(t)$ (e.g., carrying a DMRS symbol for the purpose of aligning phases of the first and second UEs 10A, 10B) on a first subcarrier 172, and the second UE 10B may transmit a second signal $x_2(t)$ (e.g., carrying the same DMRS symbol) on a second subcarrier 174 in a same time period (e.g., at approximately the same time). As such, the network 74 may receive the first signal $x_1(t)$ from the first UE 10A and the second signal $x_2(t)$ from second UE 10B in a same time period (e.g., at approximately the same time) to align phases of the first and second UEs 10A, 10B.

Figure 13:
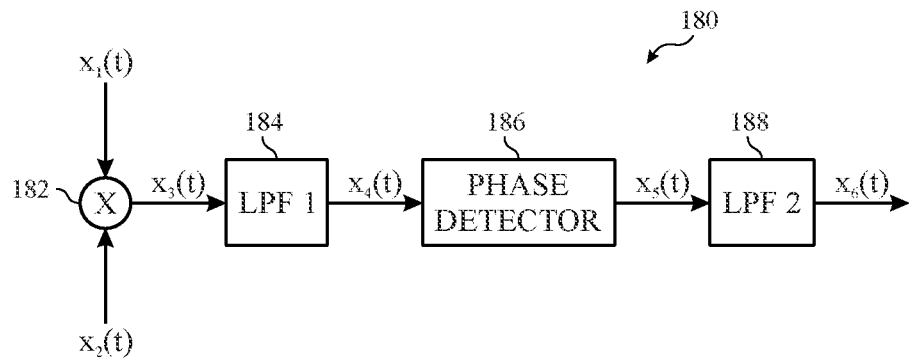
FIG. 13 is a schematic diagram of a signal processing chain of a receiver of a communication hub of a network that receives DMRS signals (e.g., having the same DMRS-carrying symbol) at the same time period and at different sub-carriers (e.g., using the RS structure of FIG. 12), according to embodiments of the present disclosure.

FIG. 13 is a schematic diagram of a signal processing chain 180 of a receiver 80 of a communication hub 76 of a network 74 that receives DMRS signals (e.g., having the same DMRS-carrying symbol) at the same time period and at different sub-carriers 162 (e.g., using the RS structure 160 of FIG. 12), according to embodiments of the present disclosure. The signal processing chain 180 may include a mixer 182 that may combines or multiplies two input signals and generates an output signal. As illustrated, the mixer 182 may receive first signal $x_1(t)$ and the second signal $x_2(t)$ (e.g., both carrying the same DMRS-carrying symbol), and multiply the two signals together to output signal $x_3(t)$. The signal processing chain 180 may also include a first low-pass filter (LPF1) 184 that may enable desired (e.g., low frequency) components of an input signal (e.g., $x_3(t)$) to pass through and filter undesired (e.g., high frequency) components from the input signal to generate a filtered output signal $x_4(t)$. The signal processing chain 180 may further include a phase detector 186 that detects a phase of an input signal (e.g., $x_4(t)$) and generate a phase signal $x_5(t)$ representative of the phase. The signal processing chain 180 also may include a second low-pass filter (LPF2) 188 that may enable desired (e.g., low frequency) components of an input signal (e.g., $x_5(t)$) to pass through and filter undesired (e.g., high frequency) components from the input signal to generate a filtered output signal $x_6(t)$.

Figure 14:
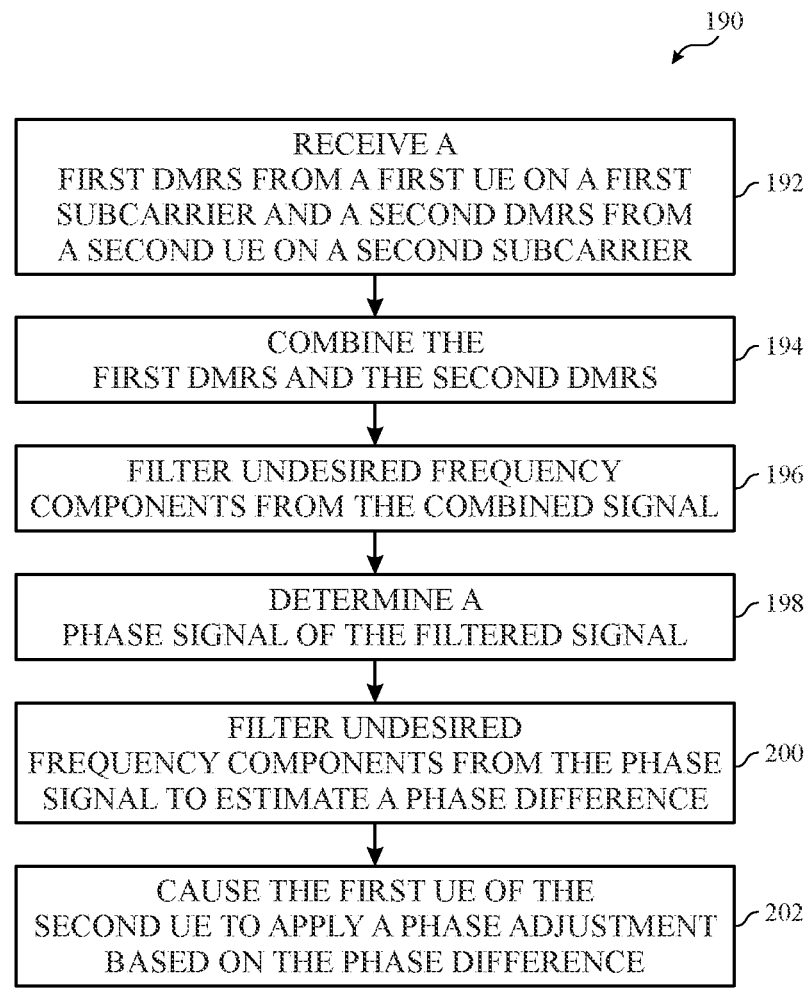
FIG. 14 is a flowchart of a method to cause a first UE and/or a second UE to align phases with one another based on DMRS signals (e.g., having the same DMRS-carrying symbol) received at the same time period and at different sub-carriers (e.g., using the RS structure of FIG. 12), according to embodiments of the present disclosure.

FIG. 14 is a flowchart of a method 190 to cause a first UE (e.g., 10A) and/or a second UE (e.g., 10B) to align phases with one another (e.g., using the signal processing chain 180 of FIG. 13) based on DMRS signals (e.g., having the same DMRS-carrying symbol) received at the same time period and at different sub-carriers (e.g., using the RS structure 160 of FIG. 12), according to embodiments of the present disclosure. Any suitable device (e.g., a controller) that may control components of a network 74, such as a communication hub 76 and/or a processor 12 of the network 74, may perform the method 190. In some embodiments, the method 190 may be implemented by executing instructions stored in a tangible, non-transitory, computer-readable medium, such as a memory 14 or storage device 16 of the network 74, using the processor 12. For example, the method 190 may be performed at least in part by one or more software components, such as an operating system of the network 74, one or more software applications of the network 74, and the like. While the method 190 is described using steps in a specific sequence, it should be understood that the present disclosure contemplates that the described steps may be performed in different sequences than the sequence illustrated, and certain described steps may be skipped or not performed altogether.

In process block 192, the network 74 receives a first DMRS $x_1(t)$ from a first UE (e.g., 10A) on a first subcarrier and a second DMRS $x_2(t)$ from a second UE (e.g., 10B) on a second subcarrier in a same time period (e.g., at approximately the same time). For example, the first DMRS may be represented by Equation 13:

$$x_1(t)=\cos(\omega_1 t+\phi_1)+n_1(t) \qquad \text{(Equation 13)}$$

where $\omega_1$ represents an angular frequency of the first DMRS, $\phi_1$ represents a phase of the first DMRS, and $n_1$ represents noise of the first DMRS. Similarly, the second DMRS may be represented with Equation 14:

$$x_2(t)=\cos(\omega_2 t+\phi_2)+n_2(t) \qquad \text{(Equation 14)}$$

where $\omega_2$ represents an angular frequency of the second DMRS, $\phi_2$ represents a phase of the second DMRS, and $n_2$ represents noise of the second DMRS.

In process block 194, the network 74 then combines the first DMRS $x_1(t)$ and the second DMRS $x_2(t)$ (e.g., by using the mixer 182 to multiply the two together) to generate a product $x_3(t)$. In particular, the network 74 may input the first DMRS $x_1(t)$ and the second DMRS $x_2(t)$ into the mixer 182, which may multiply the two signals together to generate the combined signal $x_3(t)$. $x_3(t)$ may be expressed by Equation 15:

$$x_3(t)=\cos((\omega_1+\omega_2)t+\phi_1+\phi_2)+\cos((\omega_1-\omega_2)t+\phi_1-\phi_2)+n_3(t) \quad \text{(Equation 15)}$$

In process block 196, the network 74 filters undesired (e.g., high frequency) components from the combined signal $x_3(t)$. In particular, the network 74 may pass $x_3(t)$ through the first low-pass filter 184 to enable desired (e.g., low frequency) components to pass through and filter the undesired components, resulting in the filtered signal $x_4(t)$, as expressed in Equation 16:

$$x_4(t)=\cos((\omega_1-\omega_2)t+\phi_1-\phi_2)+n_4(t) \quad \text{(Equation 16)}$$

In process block 198, the network 74 determines a phase signal of the filtered signal $x_4(t)$. That is, the network 74 may pass $x_4(t)$ through the phase detector 186 to generate a phase signal $x_5(t)$, as expressed in Equation 17:

$$x_5(t)=(\omega_1-\omega_2)t+\phi_1-\phi_2+n_5(t) \quad \text{(Equation 17)}$$

In process block 200, the network 74 filters undesired (e.g., high frequency) components from the phase signal $x_4(t)$. In particular, the network 74 may pass $x_5(t)$ through the second low-pass filter 188 to filter out undesired (e.g., high frequency) components from the phase signal, resulting in the filtered signal $x_6(t)$, as expressed in Equation 18:

$$x_6(t)=\phi_1-\phi_2+n_6(t) \quad \text{(Equation 18)}$$

In this manner, the network 74 determines this phase difference (e.g., $x_6(t)$) between the first DMRS $x_1(t)$ and the second DMRS $x_2(t)$, and may send an indication of the phase difference (e.g., in the form of a correction signal) to the first UE 10A and/or the second UE 10B to cause either or both of the UEs 10 to adjust their phases based on the phase difference (e.g., $\phi_1-\phi_2$), as shown in process block 202. The UEs 10 may then send data in any suitable manner discussed above as referenced by FIGS. 5-11. The data may, for example, include voice call data and/or messaging data (e.g., electronic mail data, SMS data, and so on). In particular, each UE 10 may send the data without having to excessively divide its transmission power among an excessive number of transmit antennas 55. As such, the transmit power that each UE 10 sends its data may be higher than or equal to the transmit power each UE 10 uses to send its DMRS signals (which may have been sent using a transmit power that, at best, was not divided among their respective transmitter antennas 55). In this manner, the UEs 10 may avoid unintended beamforming due to misalignment of transmissions in time.

Figure 15:
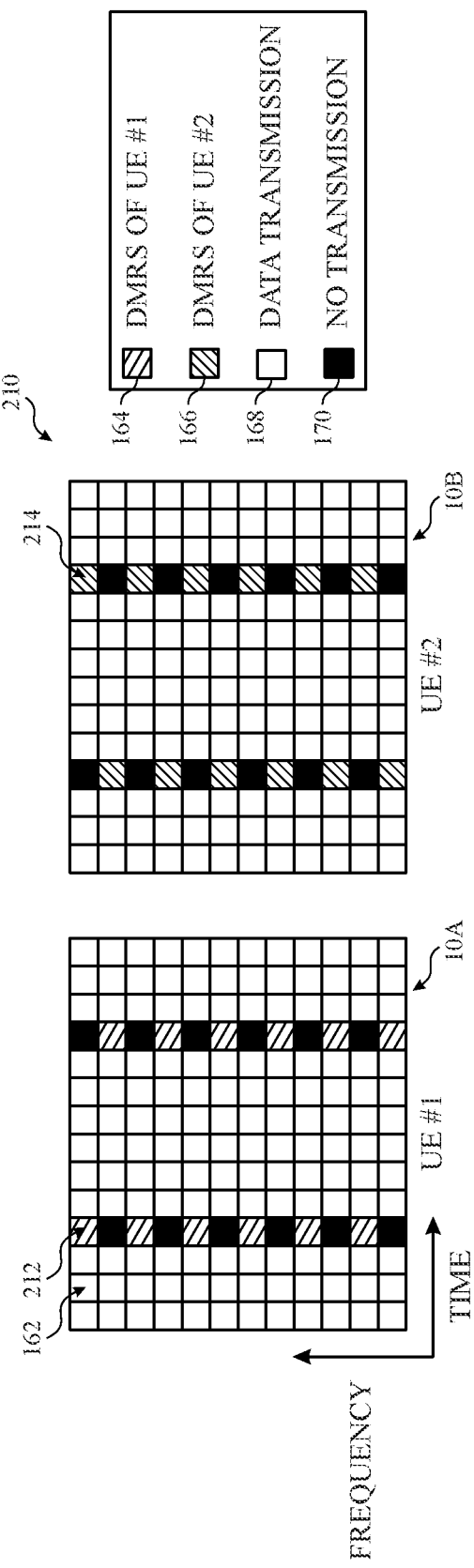
FIG. 15 is a set of plots of an RS structure for which demodulation reference signal (DMRS)-carrying symbols are received at the same time period and at different sub-carriers, according to embodiments of the present disclosure.
Figure 16:
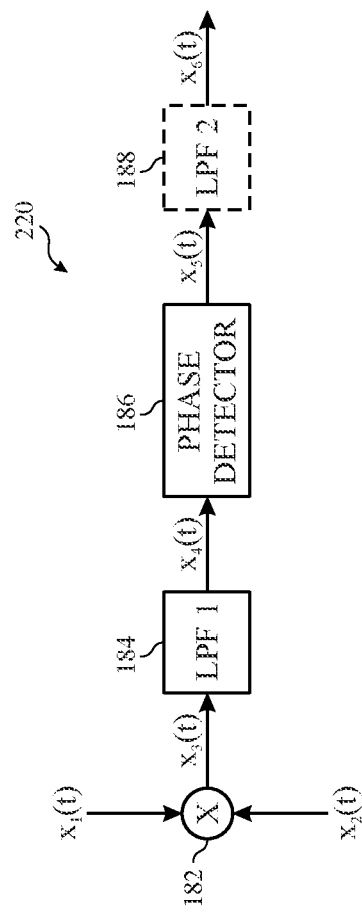
FIG. 16 is a schematic diagram of a signal processing chain of a receiver of a communication hub of a network that receives DMRS signals (e.g., having the same DMRS-carrying symbol) at different time periods and on the same sub-carrier (e.g., using the RS structure of FIG. 15), according to embodiments of the present disclosure.
Figure 17:
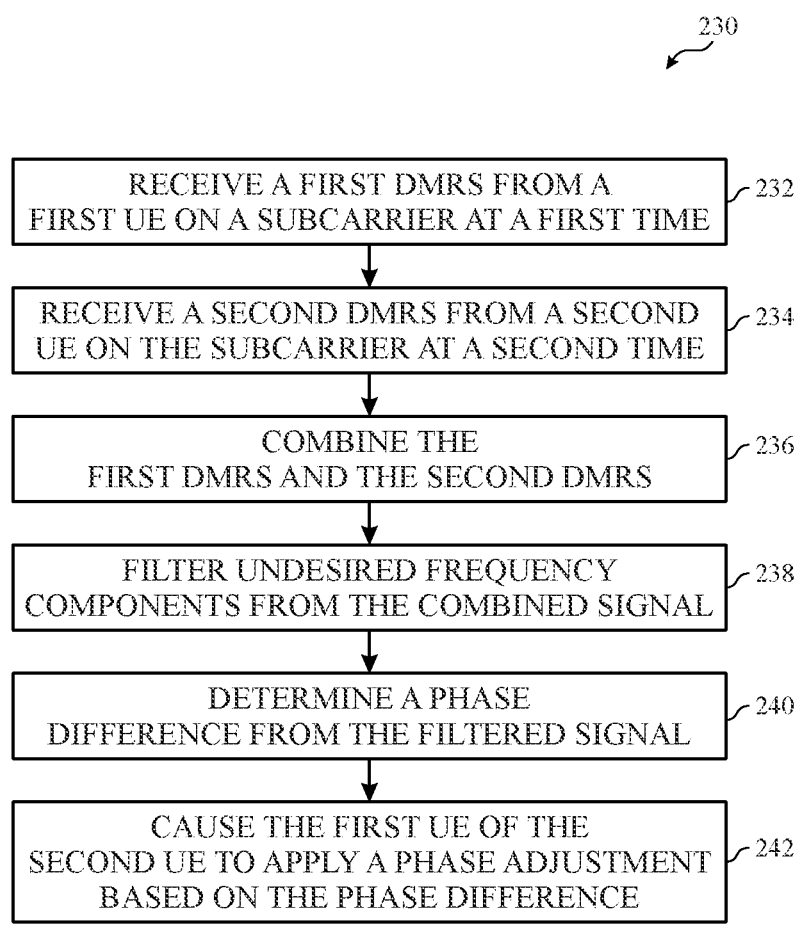
FIG. 17 is a flowchart of a method to cause a first UE and/or a second UE to align phases with one another based on DMRS signals (e.g., having the same DMRS-carrying symbol) received at different time periods and on the same sub-carrier (e.g., using the RS structure of FIG. 15), according to embodiments of the present disclosure.

FIGS. 15-17 illustrate an alternative or additional embodiment to that shown in FIGS. 12-14, where the network 74 receives the first DMRS $x_1(t)$ from a first UE (e.g., 10A) at a first time on a subcarrier, and receives the second DMRS $x_2(t)$ from second UE (e.g., 10B) at a second time on the same subcarrier. FIG. 15 is a set of plots of an RS structure 210 for which demodulation reference signal (DMRS)-carrying symbols are received at the same time period and at different sub-carriers 162, according to embodiments of the present disclosure. The set of plots of the RS structure 210 each have a horizontal axis representing time (apportioned into time periods) and a vertical axis representing frequency (apportioned into sub-carriers 162). As illustrated, the first UE 10A may transmit a first signal $x_1(t)$ (e.g., carrying a DMRS symbol for the purpose of aligning phases of the first and second UEs 10A, 10B) on a subcarrier 162 at a first time period 212, and the second UE 10B may transmit a second signal $x_2(t)$ (e.g., carrying the same DMRS symbol) on the same subcarrier 162 at a second time period 214. As such, the network 74 may receive the first signal $x_1(t)$ from the first UE 10A and the second signal $x_2(t)$ from second UE 10B on the same subcarrier 162 and at different time periods (e.g., 212, 214) to align phases of the first and second UEs 10A, 10B.

FIG. 16 is a schematic diagram of a signal processing chain 220 of a receiver 80 of a communication hub 76 of a network 74 that receives DMRS signals (e.g., having the same DMRS-carrying symbol) at different time periods (e.g., 212, 214) and on the same sub-carrier 162 (e.g., using the RS structure 210 of FIG. 15), according to embodiments of the present disclosure. The signal processing chain 220 may include a mixer 182 that combines or multiplies two input signals and generates an output signal. As illustrated, the mixer 182 may receive first signal $x_1(t)$ and the second signal $x_2(t)$ (e.g., both carrying the same DMRS-carrying symbol), and multiply the two signals together to output signal $x_3(t)$. The signal processing chain 220 may also include a first low-pass filter (LPF1) 184 that may enable desired (e.g., low frequency) components of an input signal (e.g., $x_3(t)$) to pass through and filter undesired (e.g., high frequency) components from the input signal to generate a filtered output signal $x_4(t)$. The signal processing chain 220 may further include a phase detector 186 that detects a phase of an input signal (e.g., $x_4(t)$) and generate a phase signal $x_5(t)$ representative of the phase. The signal processing chain 220 also may optionally include a second low-pass filter (LPF2) 188 that may enable desired (e.g., low frequency) components of an input signal (e.g., $x_5(t)$) to pass through and filter undesired (e.g., high frequency) components from the input signal to generate a filtered output signal $x_6(t)$. That is, because the same subcarrier 162 is used to send the same DMRS-carrying symbol from the UEs 10, the angular frequency ω may be identical between the first DMRS $x_1(t)$ and the second DMRS $x_2(t)$. Thus, the second low-pass filter 188 may be omitted as it may not be required to determine the phase difference (e.g., $\phi_1-\phi_2$) (though it may be optionally included to reduce noise). Advantageously, the embodiment shown in FIGS. 15-17 may reduce complexity of the receiver 80 of the communication hub 76 of the network 74 and/or power usage by removing the use of a low-pass filter to determine the phase difference. However, because the DMRS signals $x_1(t)$ and $x_2(t)$ are not received at the same time, there may be added latency when implementing this embodiment, as compared to that shown in FIGS. 12-14.

FIG. 17 is a flowchart of a method 230 to cause a first UE (e.g., 10A) and/or a second UE (e.g., 10B) to align phases with one another (e.g., using the signal processing chain 220 of FIG. 16) based on DMRS signals (e.g., having the same DMRS-carrying symbol) received at different time periods and on the same sub-carrier (e.g., using the RS structure 210 of FIG. 15), according to embodiments of the present disclosure. Any suitable device (e.g., a controller) that may control components of a network 74, such as a communication hub 76 and/or a processor 12 of the network 74, may perform the method 230. In some embodiments, the method 230 may be implemented by executing instructions stored in a tangible, non-transitory, computer-readable medium, such as a memory 14 or storage device 16 of the network 74, using the processor 12. For example, the method 230 may be performed at least in part by one or more software components, such as an operating system of the network 74, one or more software applications of the network 74, and the like. While the method 230 is described using steps in a specific sequence, it should be understood that the present disclosure contemplates that the described steps may be performed in different sequences than the sequence illustrated, and certain described steps may be skipped or not performed altogether.

In process block 232, the network 74 receives a first DMRS $x_1(t)$ from a first UE (e.g., 10A) on a subcarrier 162 at a first time (e.g., 212). In process block 234, the network receives a second DMRS $x_2(t)$ from a second UE (e.g., 10B) on the same subcarrier 162 at a second, different time period (e.g., 214). For example, the first DMRS may be represented by Equation 19:

$$x_1(t)=\cos(\omega t+\phi_1)+n_1(t) \quad \text{(Equation 19)}$$

The second DMRS may be represented with Equation 20:

$$x_2(t)=\cos(\omega t+\phi_2)+n_2(t) \quad \text{(Equation 20)}$$

In process block 236, the network 74 then combines the first DMRS $x_1(t)$ and the second DMRS $x_2(t)$ (e.g., by using the mixer 182 to multiply the two together) to generate a product $x_3(t)$. In particular, the network 74 may input the first DMRS $x_1(t)$ and the second DMRS $x_2(t)$ into the mixer 182, which may multiply the two signals together to generate the combined signal $x_3(t)$. $x_3(t)$ may be expressed by Equation 21:

$$x_3(t)=\cos(2\omega t+\phi_1+\phi_2)+\cos(\phi_1-\phi_2)+n_3(t) \quad \text{(Equation 21)}$$

In process block 238, the network 74 filters undesired (e.g., high frequency) components from the combined signal $x_3(t)$. In particular, the network 74 may pass $x_3(t)$ through the first low-pass filter 184 to enable desired (e.g., low frequency) components to pass through and filter the undesired components, resulting in the filtered signal $x_4(t)$, as expressed in Equation 22:

$$x_4(t)=\cos(\phi_1-\phi_2)+n_4(t) \quad \text{(Equation 22)}$$

In process block 240, the network 74 determines a phase signal of the filtered signal $x_4(t)$. That is, the network 74 may pass $x_4(t)$ through the phase detector 186 to generate a phase signal $x_5(t)$, as expressed in Equation 23:

$$x_5(t)=\phi_1-\phi_2+n_5(t) \quad \text{(Equation 23)}$$

As previously mentioned, the signal processing chain 180 also may optionally include the second low-pass filter (LPF2) 188 to reduce noise in the signal $x_5(t)$. Thus, the network 74 may pass $x_5(t)$ through the second low-pass filter 188. In this manner, the network 74 determines this phase difference (e.g., $x_5(t)$) between the first DMRS $x_1(t)$ and the second DMRS $x_2(t)$, and may send an indication of the phase difference (e.g., in the form of a correction signal) to the first UE 10A and/or the second UE 10B to cause either or both of the UEs 10 to adjust their phases based on the phase difference (e.g., $\phi_1-\phi_2$), as shown in process block 242. The UEs 10 may then send data in any suitable manner discussed above as referenced by FIGS. 5-11, thus avoiding unintended beamforming due to misalignment of transmissions in time, while reducing complexity of the receiver 80 of the communication hub 76 of the network 74 and/or power usage by removing the use second low-pass filter 188 to determine the phase difference. The data may, for example, include voice call data and/or messaging data (e.g., electronic mail data, SMS data, and so on).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:
a transmitter;
a receiver; and
processing circuitry communicatively coupled to the transmitter and the receiver, the processing circuitry configured to
exchange, on a side channel, data with additional user equipment to be transmitted to a communication hub;
send, using the transmitter on a first channel, an indication to the communication hub that the data is ready to be sent;
receive, using the receiver on the first channel, a grant from the communication hub to send the data;
send, on the side channel, an additional indication to the additional user equipment that the grant from the communication hub is received, wherein the additional indication is configured to cause the additional user equipment to send the data to the communication hub on a second channel; and
send, using the transmitter on the first channel, the data to the communication hub.

2. The user equipment of claim 1, wherein the processing circuitry is configured to initiate exchange of the data with the additional user equipment on the side channel.

3. The user equipment of claim 1, wherein the processing circuitry is configured to send, using the transmitter on the first channel, the data to the communication hub by sending, using the transmitter, a first portion of the data to the communication hub on the first channel at a first time and a negative complex conjugate of a second portion of the data to the communication hub on the first channel at a second time.

4. The user equipment of claim 3, wherein the additional user equipment is configured to send the second portion of the data to the communication hub on the second channel at the first time and a complex conjugate of the first portion of the data to the communication hub on the second channel at the second time.

5. The user equipment of claim 1, wherein the communication hub is configured to extract the data using space-time orthogonal block decoding.

6. The user equipment of claim 1, wherein the processing circuitry is configured to send the data to the communication hub by sending, using the transmitter, a first portion of the data to the communication hub on the first channel while the additional user equipment is configured to send a second portion of the data to the communication hub on the second channel.

7. The user equipment of claim 1, wherein the communication hub is configured to extract the data using a maximum likelihood technique, a zero forcing technique, a minimum mean-square error technique, a successive interference cancellation technique, an ordered successive interference cancellation technique, or any combination thereof.

8. The user equipment of claim 1, wherein the grant comprises one or more indexes for the user equipment, and wherein the processing circuitry is configured to adjust a demodulation reference signal pattern to synchronize the user equipment and the additional user equipment based on the one or more indexes.

9. A method comprising:
exchanging, on a sidelink, data with user equipment to be transmitted to a communication hub;
transmitting, using a transmitter on a first channel, an indication to the communication hub that the data is ready to be sent;
receiving, using a receiver on the first channel, a grant from the communication hub to send the data;
transmitting, on the sidelink, an additional indication to the user equipment that the grant from the communication hub is received, wherein the additional indication is configured to cause the user equipment to transmit the data to the communication hub on a second channel; and
transmitting, using the transmitter on the first channel, the data to the communication hub.

10. The method of claim 9, comprising initiating exchange of the data with the user equipment.

11. The method of claim 10, wherein initiating the exchange of the data with the user equipment is performed via the sidelink.

12. The method of claim 9, wherein transmitting, using the transmitter on the first channel, the data to the communication hub comprises transmitting a first portion of the data to the communication hub at a first time and a negative complex conjugate of a second portion of the data to the communication hub at a second time.

13. The method of claim 9, wherein transmitting, using the transmitter on the first channel, the data to the communication hub comprises transmitting the data to the communication hub by transmitting a first portion of the data to the communication hub while the user equipment is configured to transmit a second portion of the data to the communication hub.

14. One or more non-transitory, tangible, computer-readable media storing instructions that cause processing circuitry to:
exchange, on a sidelink, data with user equipment to be transmitted to a communication hub;
receive an indication of a grant to exchange the data;
send, on the sidelink, an additional indication to the user equipment that the grant from the communication hub is received, wherein the additional indication causes the user equipment to transmit the data to the communication hub without using the sidelink; and
transmit, without using the sidelink, the data to the communication hub.

15. The one or more non-transitory, tangible, computer-readable media of claim 14, wherein the instructions cause the processing circuitry to initiate exchange of the data with the user equipment on the sidelink.

16. The one or more non-transitory, tangible, computer-readable media of claim 15, wherein the sidelink comprises a device-to-device or peer-to-peer communication protocol.

17. The one or more non-transitory, tangible, computer-readable media of claim 14, wherein the indication of the grant to exchange the data is received from the user equipment on the sidelink.

18. The one or more non-transitory, tangible, computer-readable media of claim 14, wherein the indication of the grant to exchange the data is received from the communication hub without using the sidelink.

19. The one or more non-transitory, tangible, computer-readable media of claim 14, wherein the user equipment is configured to indicate that the data is ready to be transmitted.

20. The one or more non-transitory, tangible, computer-readable media of claim 14, wherein the communication hub comprises a base station, high altitude base station, a satellite, a ground station, or an access point.

* * * * *